United States Patent Office

3,502,727
Patented Mar. 24, 1970

3,502,727
AMINO-SUBSTITUTED MERCAPTO COMPOUNDS AND THEIR PREPARATION BY THE REACTION OF AMINOTHIOSULFURIC ACIDS AND AZIRIDINES AND SUBSEQUENT HYDROLYSIS
Raymond L. Cobb, Bartlesville, Okla., assignor to Phillips Petroleum Company, a corporation of Delaware
No Drawing. Filed Jan. 13, 1966, Ser. No. 520,377
Int. Cl. C07c *149/24, 93/06, 91/02*
U.S. Cl. 260—584                                   8 Claims

ABSTRACT OF THE DISCLOSURE

A method for producing polyfunctional amino-substituted mercapto compounds which comprises reacting an aminoalkanethiosulfuric acid with an aziridinyl compound in the presence of a polar solvent which causes the aziridine ring to break and the addition reaction to occur at the terminal amino group site on the aminoalkanethiosulfuric acid molecule. The resulting polyfunctional amino-substituted mercapto acid can then be hydrolyzed to form the corresponding thiol compound.

---

This invention relates to novel compounds. In one aspect this invention relates to derivatives of aminoalkanethiosulfuric acids having multifunctional chemical groups substituted thereon. In another aspect, this invention relates to a novel method for opening an aziridine ring to produce novel polyfunctional compounds. In yet another aspect, this invention relates to a method for preparing 2-(2-aminopropylamino)-2,2-bis(hydroxymethyl) ethanethiosulfuric acid and 2-(2-aminopropylamino)-2,2-bis(hydroxymethyl) ethanethiol.

This invention relates to a novel method for opening an aziridinyl ring. Aziridinyl rings have been known to be opened under mild reaction conditions between the hetero atom and the carbon atom. It has now been discovered that novel polyfunctional thiosulfuric acids and mercaptans can be produced by the opening of an aziridinyl ring with an aminoalkanethiosulfuric acid compound. The amino group in this molecule has been found to provide a hydrogen atom sufficiently reactive to cause opening of the ring and formation of the corresponding acids. These substituted thiosulfuric acids can then be hydrolyzed to form novel polyfunctional mercapto compounds which are useful as shortstops in radical initiated polymerization systems. In addition, as multifunctional compounds they are also valuable intermediates in the synthesis of other compounds.

Therefore, an object of this invention is to provide novel polyfunctional thiosulfuric acid compounds and also novel polyfunctional mercaptans.

It is another object of this invention to provide a novel method for opening an aziridinyl ring.

Yet another object of this invention is to provide S[2-(2-aminopropylamino)-2,2-bis(hydroxymethyl)ethyl] thiosulfuric acid and 2-(2-aminopropylamino)-2,2-bis(hydroxymethyl)ethanethiol.

Other objects and advantages of this invention will be apparent from the following description and the novel features will be particularly pointed out hereinafter in connection with the appended claims.

The process of this invention can be illustrated by the following series of equations:

(I)

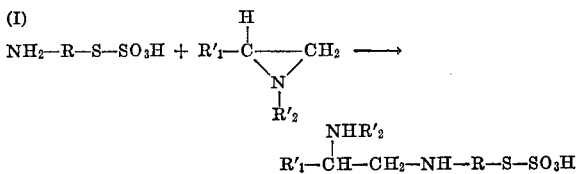

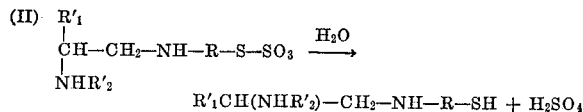

wherein R is one selected from the group consisting of an alkylene radical containing from 2 to 20 carbon atoms, a hydroxy substituted alkylene radical containing from 2 to 20 carbon atoms having 1 to 4 hydroxy groups substituted therein and an alkoxy or aryloxy substituted alkylene radical containing from 2 to 20 carbon atoms having from 1 to 4 alkoxy or aryloxy radicals and each alkoxy or aryloxy radical having 1 to 8 carbon atoms; $R'_1$ is selected from the group consisting of H, alkyl, aryl, cycloalkyl, alkoxy, aryloxy radicals, and combinations thereof such as alkaryl, aralkyl and the like radicals; $R'_2$ is hydrogen or methyl; and the total number of C atoms in the aziridine ranging from 2 to 10.

Suitable examples of aziridinyl compounds useful in the practice of this invention are as follows: azirane, 2-methylaziridine, 2-ethylaziridine, 2-isopropylaziridine, 2-benzylaziridine, 2-phenethylaziridine, cyclohexylaziridine, 2-(ethoxy)-methylaziridine, 2-phenoxymethylaziridine, N-methyl-2-methylaziridine, 2-butylaziridine. These hydrogen, alkyl, aryl, cycloalkyl, alkoxy, aryloxy, arylalkyl, alkoxyaryl, or aryloxyalkyl-substituted aziridinyl compounds each contain 2–10 carbon atoms per molecule.

The reaction I is carried out in the presence of a polar solvent, said solvent being selected from the group consisting of water, alcohols having from 1 to 8 carbon aziridine, 2-ethylaziridine, 2-isopropylaziridine, 2-benzylatoms, glycols having from to 2 to 8 carbon atoms, dimethylformamide, acetonitrile. The temperature depends on the boiling point of the particular solvent and imine employed but should ordinarily not exceed 200° C. The mixture is refluxed for a period usually extending from 2 to 72 hours, preferably from 6 to 20 hours, although longer or shorter periods can be employed in some instances.

It is to be understood that these compounds can be prepared in a continuous method in the solvents disclosed hereinabove and can be recovered by conventional methods such as crystallization, distillation, solvent extraction, and the like. It may also be desirable to permit the reaction mixture to stand at ambient temperatures or under refrigeration from 2 to 24 hours to permit the product to separate spontaneously.

In order to more fully describe the subject invention, the following examples are offered as an illustration thereof.

EXAMPLE I

Ten grams (0.046 mol) of the S[2-amino-2,2-bis (hydroxymethyl)ethyl]-thio sulfuric acid was mixed with 2.62 grams (0.046 mol) of 2-methylaziridine and heated under reflux for 18 hours. Fifty milliliters of methanol were added to the mixture as a solvent. The reaction mixture was only slightly basic and no odor of methylaziridine was noted. The solution was allowed to stand at room temperature and then the volatiles were distilled in vacuum (30 millimeters of mercury). The residue was taken up in tetrahydrofuran containing sufficient methanol to effect complete solution.

The solution was clear at room temperature and became turbid at 0° C. and formed two layers at −70° C. When the solvents were removed, the residual oil was very soluble in methanol, insoluble in isopropyl alcohol, and moderately soluble in ethanol. The oil was dissolved in ethanol and the resulting solution was cooled to −70° C. to give a crystalline solid. At room temperature the collected solid became a yellow oil. This was dried at room temperature over H₂SO₄ and finally at 80 to 85° C./0.1 mm. Hg for 10 hours to give a hard glass.

*Analysis.*—Calc. for C₇H₁₈N₂O₅S₂—½C₂H₅OH (percent): C, 32.20; H, 7.43; N, 9.39; S, 21.49; O, 29.49. Found (percent): C, 32.9; H, 7.2; N, 10.1; S, 20.5; O, 29.6. The NMR spectrum agrees with the structure

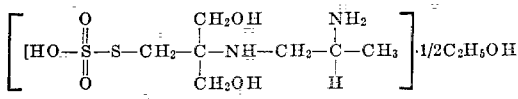

EXAMPLE II

Ten grams (0.037 mol) of the product from Example I is treated with 100 ml. 6 N sulfuric acid under nitrogen for 4 hours at reflux. The water is stripped under reduced pressure (60 mm. Hg) to leave the corresponding thiol salt 2 - (2 - aminopropylamino) - 2,2 - bis(hydroxymethyl) ethane thiol sulfate which was further purified by several extractions with propanol.

The following products can be prepared by following the teaching of this disclosure:

S[2-(2-aminopropylamino)-2,2-bis(hydroxymethyl) ethyl]thiosulfuric acid 2-(2-aminopropylamino)-2,2-bis(hydroxymethyl) ethanethiol S[5-(2-amino-3-phenylpropylamino)eicosyl] thiosulfuric acid 5-(2-amino-3-phenylpropylamino)eicosanethiol S[1,2-bis(phenoxymethyl)-2-(2-amino-3-ethoxypropyl-amino)ethyl]thiosulfuric acid 1,2-bis(phenoxymethyl)-2-(2-amino-3-ethoxypropyl-amino)ethanethiol S[2-(2-methylaminopropylamino)-2,2-bis(hydroxy-methyl)ethyl]thiosulfuric acid 2-(2-methylaminopropylamino)-2,2-bis(hydroxymethyl) ethanethiol

What is claimed is:

1. As a composition of matter, a compound according to the formula

I) 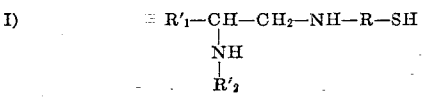

wherein R is a hydroxy-substituted alkylene radical containing 2 carbon atoms, having one carbon atom to which are attached two hydroxymethyl groups, or an aryloxy-substituted alkylene radical, the alkylene radical containing 2 carbon atoms having one carbon atom to which are attached two aryloxy groups, each aryloxy group having 6–8 carbon atoms; R' is a hydrogen, alkyl, aryl, cycloalkyl, alkoxy, aryloxy, arylalkyl, alkoxyaryl, or aryloxyalkyl each having 1–8 carbon atoms, and R'₂ is hydrogen or methyl.

2. As a composition of matter, a compound according to claim 1 wherein R is a 2,2-bis(hydroxymethyl)ethylene radical.

3. 2 - (2 - aminopropylamine) - 2,2 - bis(hydroxymethyl) ethanethiol.

4. A method of preparing compounds of the formula (I) 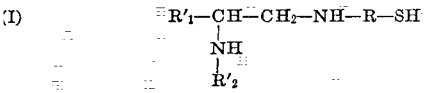

wherein R is a hydroxy-substituted alkylene radical containing 2 carbon atoms, having one carbon atom to which are attached two hydroxymethyl groups, or an aryloxy-substituted alkylene radical, the alkylene radical containing 2 carbon atoms and having one carbon atom to which are attached two aryloxy groups, each aryloxy group having 6–8 carbon atoms; R'₁ is hydrogen, alkyl, aryl, cycloalkyl, alkoxy, aryloxy, arylalkyl, alkoxyaryl, or aryloxyalkyl each having 1–8 carbon atoms, and R'₂ is hydrogen or methyl; said method consisting essentially of reacting in the presence of a polar solvent at a temperature in the range of from room temperature to reflux conditions an amino thiosulfuric acid of the formula (II)    

wherein R is as defined above, with an aziridine of the formula (III) 

wherein R'₁ and R'₂ are as defined above and the total number of carbon atoms in the aziridine is from 2–10, hydrolyzing the reaction product thus formed with an acid and recovering the product according to the Formula I above.

5. A method according to claim 4 wherein the polar solvent is water, alcohols having from 1–8 carbon atoms, glycols having from 2–8 carbon atoms, dimethylformamide, or acetonitrile.

6. A method according to claim 4 wherein R in Formula I is a 2,2-bis(hydroxymethyl)ethylene radical, and the compound of Formula II is S[2-amino-2,2-bis(hydroxymethyl)ethyl]-thiosulfuric acid.

7. A method according to claim 5 wherein the temperature is in the range of from room temperature to 200° C.

8. A method according to claim 6 wherein the compound of Formula II is S[2-amino-2,2-bis(hydroxymethyl) ethyl]-thiosulfuric acid; the compound of Formula III is 2-methylaziridine; the polar solvent is methanol, the temperature is room temperature, the acid is sulfuric acid, and the compound of Formula I is 2-(2-aminopropyl-amine)-2,2-bis(hydroxymethyl)ethanethiol.

References Cited

UNITED STATES PATENTS

| | | |
|---|---|---|
| 2,245,971 | 6/1941 | Felix et al. |
| 3,072,542 | 1/1962 | Johnson et al. _____ 260—583 X |
| 3,312,732 | 4/1967 | Gollis et al. _____ 260—583 X |
| 3,352,898 | 11/1967 | James _____ 260—453 |
| 3,364,247 | 1/1968 | Gollis _____ 260—453 |

OTHER REFERENCES

Chemirad Corporation, Ethylene Imine Chemistry, 1962, p. 7.

Reid: Organic Chemistry of Bivalent Sulfur, volume I, p. 32, 1958.

The Dow Chemical Co., Ethylenimine, 1963, pp. 4, 5 and 17.

Reid: The Chemistry of Bivalent Sulphur, volume 1, p. 29.

Weissberger: Heterocyclic Compounds, p. 555.

CHARLES B. PARKER, Primary Examiner

S. T. LAWRENCE III, Assistant Examiner

U.S. Cl. X.R.

260—239, 453, 563, 570.7